Figure 1:
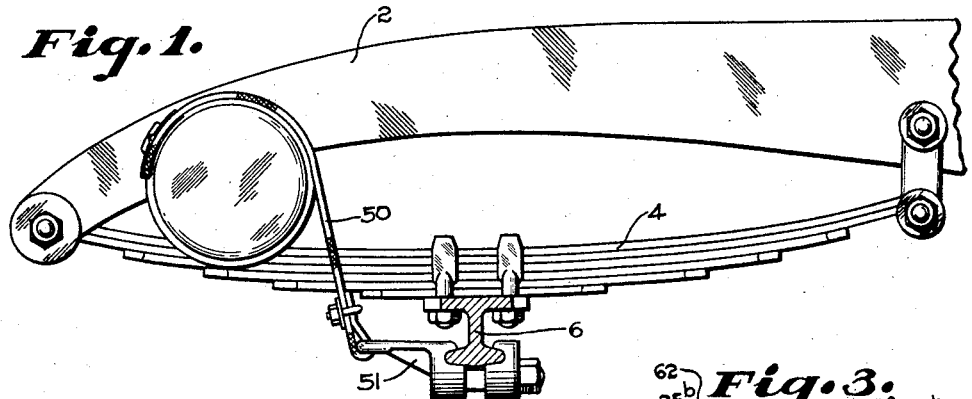

Jan. 11, 1927.

R. H. HASSLER 1,613,883

BELT FASTENER

Filed June 23, 1925

INVENTOR
Robert H. Hassler,
BY Raymond F. Buckley
ATTORNEY

Patented Jan. 11, 1927.

1,613,888

UNITED STATES PATENT OFFICE.

ROBERT H. HASSLER, OF INDIANAPOLIS, INDIANA, ASSIGNOR TO ROBERT H. HASSLER, INC., OF INDIANAPOLIS, INDIANA, A CORPORATION.

BELT FASTENER.

Application filed June 23, 1925. Serial No. 39,154.

This invention relates generally to improvements in restraining devices for springs of motor vehicles, and is more particularly directed to the provision of means for attaching the flexible connecting member or belt to the device.

A further object of the invention is to provide a belt fastener in which an anchor plate, centrally located with respect to the belt fastener, can be utilized as a driving member without the necessity of any of the usual nuts, bolts or rivets for maintaining operative engagement of the parts.

Another object of the invention is to provide simple means which will permit the belt to be attached to the restraining device without the necessity of dismantling it for such attachment.

A further object of the invention is to provide attaching means that will enable the motor vehicle owner to install new belts without the necessity of detaching the restraining device from the vehicle.

A still further object of the invention is to provide fastening means which will serve as a protecting shield for the upper end portion of the belt where it is secured to the restraining device.

Still a further object of the invention is to provide simple locking means whereby the fastener can be securely locked in operative position.

Still another object of the invention is to provide means by which the belt can be attached and detached to and from the device without the use of bolts, nuts, rivets, etc.

With these and other objects in view, the invention consists of the construction, combination and arrangement of parts hereinafter more fully described, claimed and illustrated in the accompanying drawings in which like ordinals or reference characters indicate like parts thruout the several figures of which—

Figure 2:
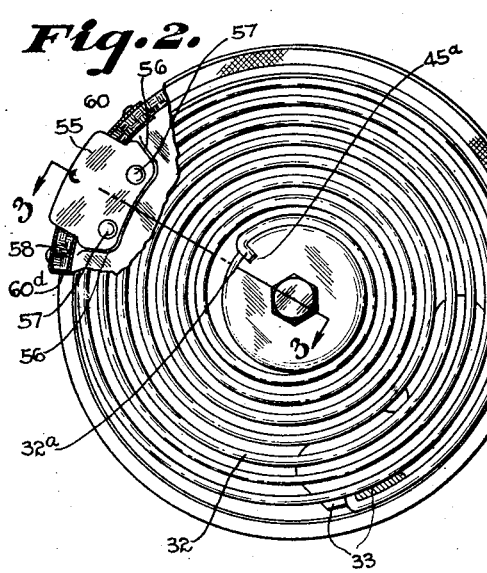
Figure 3:
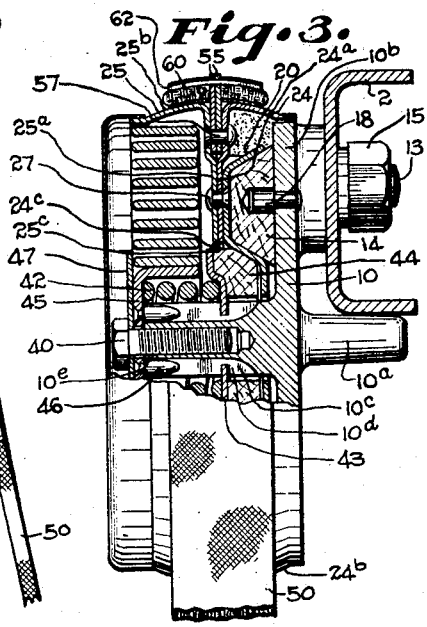
Figure 4:
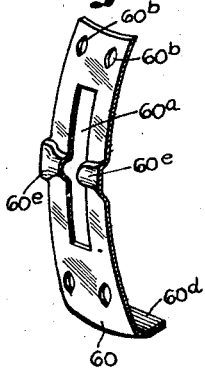
Figure 5:
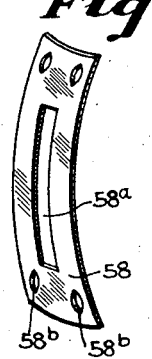
Figure 6:
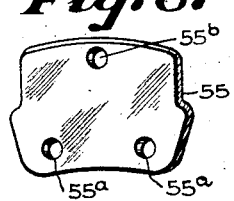
Figure 7:
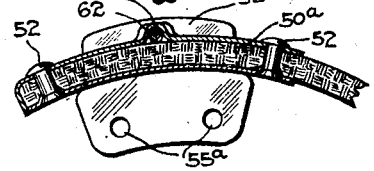

Figure 1 is a side elevation representing a fragment of a vehicle and illustrates a one way acting restraining device mounted thereon. Fig. 2 is an enlarged side elevation of the restraining device shown in Fig. 1 and is shown with the cover removed and fragments broken away and shown in section. Fig. 3 is an end elevation of Fig. 2, shown partly in section, and taken approximately on the line 3—3 in Fig. 2. Fig. 4 is an enlarged perspective view of the upper clamp plate and Fig. 5 an enlarged perspective view of the lower clamp plate. Fig. 6 is an enlarged view of the belt anchor plate and Fig. 7 is a longitudinal section of the complete fastener illustrating a fragment of the belt in place.

Referring to the drawings, 2 represents a vehicle frame, 4 a vehicle main spring connected to the frame and 6 an axle supporting the spring. 10 represents a hub support by means of which the restraining device is mounted on the frame 2 and is secured thereto by means of a securing bolt 13 and a nut 15. $10^a$ represents an outwardly disposed lug or stop which is adapted to engage against the lower flange of the frame member 2 and thereby prevents independent rotation of the rebound check unit when secured in position on the frame. $10^b$ represents an expanded circular flanged portion which forms a cover for one side of the device and upon which a friction disk 14 is non-rotatably mounted.

18 represents a plurality of dowel pins, one only of which is illustrated; these pins serve to mount the friction disk 14 on the flanged portion $10^b$ and also serve to prevent rotation of the friction disk thereon. 20 represents a conical friction cup which engages with the friction disk 14.

The friction cup 20 is non-rotatably mounted on a pair of hollow circular cupped shaped members 24 and 25 respectively, by means of a rivet 27. The members 24 and 25 are provided with flat circular disk portions $24^a$ and $25^a$ respectively, each of which blend into outwardly disposed circular flange portions $24^b$ and $25^b$ respectively, forming a cylindrical drum. The disk portions $24^a$ and $25^a$ are arranged adjacent one another and are secured together also by rivet 27. The disks $24^a$ and $25^a$ have provided in their central portions circular apertures $24^c$ and $25^c$.

$10^e$ represents a cylindrical hub portion which is horizontally disposed from the central flange or disk $10^b$ of the supporting member 10. The hub is provided with a plurality of grooves $10^d$.

40 represents a cap screw which engages in a hollow threaded portion $10^e$ provided in the horizontal axis of the hub $10^c$. 42 represents a coil compression spring which exerts a pressure against a pressure plate 43 at one extremity and against a cupped shaped adapter 45 at the other extremity. The pressure plate 43 exerts a pressure against a thrust bearing 44. The adapter 45 is provided with pins 46 which engage in the grooves 10$^d$ and prevent rotation thereon. The cap screw 40, together with a flat washer 47, holds the adapter 45 in place against the end of the hub 10$^c$.

The pressure exerted by the spring 42 forces the cup 20 against the disk 14 which sets up friction between the parts when the cup 20 is oscillated. 32 represents a spiral spring which is anchored at its outer extremity to the drum or cup 25 by means of an anchor plate 33. It is anchored at its inner extremity to the adapter 45 by means of a lipped portion 32$^a$. The lipped portion engages in a slot 45$^a$ provided in the adapter 45.

The parts thus far described can represent any conventional type of one way restraining device, and this particular form is employed only for the purpose of clearly illustrating my invention. The operation of these devices when applied to motor vehicles, are well known to those skilled in the art.

50 represents a flexible connecting belt which is secured to the axle bracket 51, the bracket being anchored to the axle 6. My new fastener which is illustrated in the present instance for securing the upper extremity of the belt 50 to the restraining device will be described as follows:

55 is an anchor plate which is, in the present instance, secured to the circular cupped shaped members 24 and 25 by means of a pocket portion 56 formed in the disks 24$^a$ and 25$^a$. It is secured therein by means of rivets 57—57 which are inserted in apertures 55$^a$ in the anchor plate 55. The upper extremity of the anchor plate is provided with an aperture 55$^b$ which, for the purpose of illustration, is located in the central part thereof.

58 represents a lower clamp plate which conforms to, and lies adjacent the outer periphery of the circular flanges 24$^b$ and 25$^b$ respectively. The lower clamp plate is provided with a central rectangular slot 58$^a$ and with four apertures 58$^b$. 60 represents an upper clamp plate and is also provided with a rectangular slot 60$^a$ and with four apertures 60$^b$. The upper clamp plate 60 has a downwardly disposed flanged portion, 60$^d$ at one extremity, and a hollow embossed or shroud portion 60$^e$ in the center portion thereof, the hollow portion arranged to mate with the aperture 55$^b$ in the anchor plate 55.

The belt 50 is interposed between the upper and lower clamp plates and is secured in position in the present instance, by means of a plurality of rivets 52 which are inserted in the apertures 55$^a$ and 60$^b$ respectively. The slots in the upper and lower plate align with each other when assembled together. To permit the protruded portion of the anchor plate 55 to pass thru the slots 58$^a$ and 60$^a$, a similar slot 50$^a$ is provided in the belt 50. A cotter pin 62 is inserted thru the shroud 60$^e$ and thru the aperture 55$^b$ for locking the belt fastener in position on the drum.

When the fastener is in operative position on a vehicle, it will be seen that the pull exerted by the torsion or spiral spring in the restraining device will keep a constant tension on the belt which action will tend to pull the fastener snugly against the drum.

The upper and lower clamp plates of the fastener serve to protect the belt as they are usually made of metal or a material much tougher and harder than that of which the belt is made. The pulling strains exerted by the belt are transmitted directly to the clamp plates as the belt fastener will shift on the drum, when a pull is exerted by the belt, until contact is gained at one extremity of the slots 58$^a$ and 60$^a$ against the anchor plate 55 which then acts as a driving member to oscillate the drum.

The restraining device when installed on a vehicle is set in such a position that the extreme range of travel of the belt will not change the direction of pull on the fastener so that it would tend to lift it off of the drum. Locating the fastener position on the restraining device when making installations on the vehicles, permits the use of a cotter pin as a locking medium which only serves to prevent the fastener from lifting off the anchor plate, a tendency which would be caused by quick vibrations. Since there is a constant tension on the belt when in operative position, there is no slipping tendency of the fastener on the drum.

The flanged end 60$^d$ on the upper clamp plate 60 protects the extreme end of the belt from wear or fraying, and provides a smooth rounded corner for the belt to wind on if the travel of restraining device becomes great enough to cause the belt to wind completely around the drum.

It is thus seen that the invention provides a simple compact and durable construction requiring but comparatively few parts; one which will not easily get out of order; one which can be made of pressed steel stampings; and one in which a very small amount of wear should occur.

While I have illustrated and described with particularity, one preferred form of my invention, I do not desire to be limited to the exact structural details thus illustrated and described; but intend to cover all forms and arrangements which come within the terms employed in the definition of my invention constituting the appended claims.

What I claim is:

1. In a rebound check, a friction element, a drum comprising a pair of discs having oppositely disposed cylindrical flanges, a flexible belt for oscillating said drum, an anchor plate having one portion thereof extending intermediate said discs and rigidly secured therebetween and another portion extending radially from the periphery of said disc, and means for securing one end of said belt to the radially extending portion thereof.

2. In combination with a restraining device housing, a flexible actuator belt, an anchor plate secured to said housing and protruding therefrom, a pair of plates secured to said belt, and a slot in the belt and in the plates conforming to and fitting over this protruding portion of the anchor plate.

3. In a retarding device comprising an oscillatable friction drum and an actuator belt therefor, means for fastening said belt to said drum comprising a peripheral lug on said drum, said belt having an aperture adapted to receive said lug, and means disengageably engaging said lug for holding said belt thereon.

4. In a retarding device, a retarding mechanism, a lug on a movable element of said retarding mechanism, an actuator strap, a protective plate fastened on one end of said strap, said strap and said plate being apertured for receiving said lug, said lug having a transverse perforation, there being a transverse recess between said belt and said plate registering with said perforation, and a retaining pin extending through said recess and said perforation.

5. In a rebound check, a friction element, a pair of discs frictionally engaged with said element, flexible means for oscillating said discs, and an anchor plate interposed between said discs and extending radially outward from the periphery thereof for securing the flexible means thereto.

6. In a rebound check, a friction element, a pair of discs frictionally engaged with said element, said discs having outwardly-disposed cylindrical flanges, flexible means for operating said flanged discs, and an anchor plate interposed between said discs and extending radially outward from the surface of said flanges for securing the flexible means thereto.

7. In a rebound check, a friction element, an oscillating drum frictionally engaged with said element, flexible means for oscillating said drum, said drum comprising a pair of members, each member consisting of a disc portion and a flange, the disc portions of the two members being rigidly secured together, and an anchor plate interposed between said disc portions and extending outward therefrom a substantial distance beyond the peripheral surface thereof and in the same plane therewith for securing the flexible means thereto.

8. In a rebound check, an oscillating drum, a flexible strap for oscillating said drum, an anchor member projecting from said drum, a plate secured to one end of said strap, and means for removably securing said plate to said member intermediate its ends for causing the ends thereof to bear against the periphery of said drum and prevent any oscillatory movement of said securing means.

9. In a rebound check, an oscillating drum, a flexible strap for oscillating said drum, an anchor member projecting from the peripheral surface of said drum, a plate secured to one end of said strap and conforming substantially to the curvature of said drum and having a recessed portion intermediate its ends, and a pin adapted to be inserted in said recessed portions and extend through said anchor for removably securing said plate thereto intermediate its ends for causing the ends thereof to bear against said drum for preventing any oscillatory movement thereof.

10. In a rebound check, the combination with an oscillating drum, a flexible strap for oscillating the same, and an anchor member projecting therefrom, of a securing plate secured to said strap, said plate being provided with a longitudinally-extending slot for receiving said member, and transverse means for removably connecting said plate to said member intermediate its ends, the ends of said plate being adapted to bear against the periphery of said drum for preventing oscillatory movement thereof.

11. In a rebound check, the combination with an oscillating drum, a flexible strap for oscillating the same, and an anchor member projecting therefrom, of a securing plate secured to said strap, said plate being provided with a longitudinally-extending slot for receiving said member, transverse means for removably connecting said plate to said member intermediate its ends, the ends of said plate being adapted to bear against the periphery of said drum for preventing oscillatory movement thereof, and a flange formed on one end of said plate adapted to project over the free end of said strap for covering and protecting the same.

In witness whereof, I have hereunto set my hand and seal at Indianapolis, Indiana, this 15th day of June, A. D. one thousand nine hundred and twenty-five.

ROBERT H. HASSLER. [L. S.]